Sept. 12, 1967 W. J. DUNCAN 3,341,157
FISHING POLE HOLDER
Filed Aug. 22, 1966
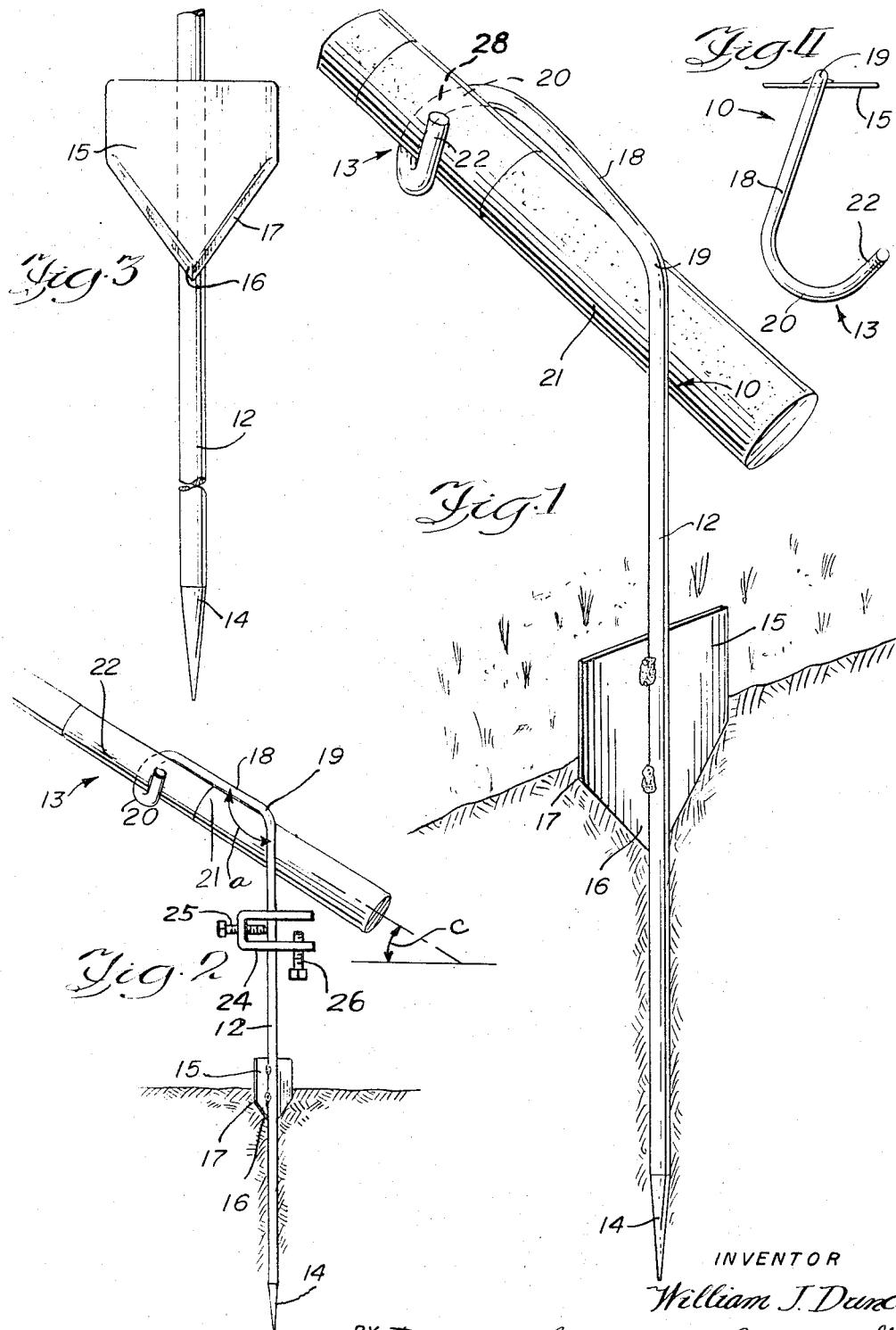
INVENTOR
William J. Duncan
BY Dressler, Goldsmith, Clement & Gordon
ATTORNEYS

United States Patent Office 3,341,157
Patented Sept. 12, 1967

3,341,157
FISHING POLE HOLDER
William J. Duncan, 805 Willow St.,
Kewanee, Ill. 61443
Filed Aug. 22, 1966, Ser. No. 574,080
2 Claims. (Cl. 248—42)

ABSTRACT OF THE DISCLOSURE

A fishing pole holder formed of a single length of rod, including a shaft portion, a portion extending laterally away from the shaft portion and a hook portion of a specified shape, terminating in a short upturned end portion that forms an acute angle with the outer end portion of the hook. The handle of a fishing pole may be supported upon the hook portion as a fulcrum, with the upper end of the fishing pole handle being wedged against the upturned end portion of the pole holder, and the lower end of the handle being wedged by the weight of the upper end of the fishing pole, against the bend that connects the shaft portion with the laterally extending portion.

---

This application is a continuation-in-part of my application Ser. No. 504,852, filed Oct. 24, 1965 and now abandoned.

This invention relates to fishing pole holders, especially of the type shaped to hold the pole in a relatively angled position with respect to the ground.

Prior fishing pole holders have been quite complex in structure, involving either a plurality of elements, or a very complicated shaping. As a result, the prior devices have been intricate in construction and, therefore, relatively costly to produce.

In accordance with the invention, a fishing pole holder is formed of a single length of rod shaped to include a straight shaft portion. The upper end of the rod extends laterally away from the shaft at an angle between 100° and 120° to form a single bend with the straight shaft portion. The forward end of the lateral extension is bent to form a simple hook, which is open at the rear facing the bend between the shaft portion and the lateral extension therefrom. The hook lies within a reference plane and follows an arc having a slightly larger radius than the radius of the handle of a fishing pole to be held. The handle of a fishing pole may be supported upon the hook as a fulcrum, with the lower end of said handle being wedged, by the weight of the upper end of the fishing pole, against the bend that connects the shaft portion and its lateral extension.

In one embodiment, the lower end of the shaft portion of the fishing pole holder of this invention is sharpened, and the shaft portion has a wedge-shaped plate with sharpened lower edges secured to the shaft portion, to facilitate further the insertion of the holder into the ground. In another embodiment, a clamp is connected to the shaft portion in order to clamp the fishing pole holder to a fixed object.

The invention will be more fully understood in the description which follows, taken in conjunction with the accompanying figures, in which:

FIG. 1 is a perspective view of one embodiment of the fishing pole holder of this invention inserted in the ground, showing a portion of a fishing pole mounted in the holder, with the ground between the viewer and the holder cut away for clarity;

FIG. 2 is a side elevation of the fishing pole holder and pole shown in FIG. 1, with the ground again cut away for clarity, and with a clamp connected to the shaft;

FIG. 3 is a fragmentary front elevation of the fishing pole holder of FIG. 1; and FIG. 4 is a top plan view of the fishing pole holder of the other figures.

Referring to FIGS. 1 and 2, there is shown a fishing pole holder 10 having a fishing pole 11 mounted therein. The holder 10 is formed of a single piece of metal rod shaped to include a straight shaft portion 12, a pole-receiving hook indicated generally at 13 at the upper end of the rod, the lower end of the rod being pointed at 14. In one form of the invention, a plate 15 is attached, as by welding, to the rod at a point intermediate the length of the shaft 12. Plate 15 is wedge-shaped and attached to the shaft 12 so that the apex 16 of the plate points downwardly. Lower edges 17 of plate 15 are preferably sharpened to further facilitate the insertion of the rod until the plate is partially buried in the ground.

In the embodiment illustrated in FIGURE 2, a clamp 24 is connected to the shaft 12 in order to enable the fishing pole holder to be connected to a relatively fixed object, such as the side of a boat. The clamp is slidable with respect to the shaft and can be fixed to the shaft by tightening bolt 25. A bolt 26 is utilized to provide the desired clamping connection between the rod and the fixed object.

Pole receiving hook 13, at the upper end of the rod, is formed by first bending the upper portion of the rod so that the upper end of the rod will extend laterally away from the shaft at an angle $a$ (FIGURE 2) of between about 100° and about 120°, with a preferred angle of 110°. The lateral extension of the rod is identified at 18. Shaft portion 12 and lateral extension 18 form between them a single bend 19, which has a function to be described below.

The forward end of the extension 18 is itself bent to form a generally horizontal, simple hook 20, which is open at the rear facing bend 19. Simple hook 20 lies within a reference plane and follows an arc having a slightly larger radius than the radius of the handle of a fishing pole to be held. As a specific example, a hook formed following an arc having a radius of approximately 1 inch was found to be very satisfactory.

The extreme end of the rod has a short upturned pole-gripping portion 22, to better confine the fishing pole within the hook 20. To keep the holder of this invention simple in structure, and economical and easy to fabricate, as well as adapted to easy and reliable use, upturned portion 22 is limited to a length no greater than the approximate diameter of the handle of fishing poles of the type with which the holder of this invention is designed to be used, and preferably only about one-half that diameter, or in other words about equal to the radius of the pole. This dimension assists in providing a secure holding effect for the fishing pole when in place in the holding device of this invention, and also makes it easy both to insert the pole in the holding device and to remove it when desired.

The upturned portion 22 extends away from the rest of the hook at an acute angle with respect to the reference plane in which the hook 20 lies, preferably slightly less than 90°, in order to exert a desired pole-holding influence. In an actual embodiment the upturned portion 22 was ¾ inch in length and the acute angle was 85°.

It is preferable for best results in fishing that a fishing pole be held so that it extends at an angle $c$ of about 40° with respect to the horizontal. To achieve this end and to provide a secure holding means, the distance between the bend 19 and the farthest point 28 on the hook is between about 3 inches and about four inches, and a preferred dimension was found to be 3¼ inches.

Plate 15 is secured to straight shaft portion 12 part way between lower pointed end 14 and upper hook portion 13, so that when holder 10 is inserted into the ground the plate may be driven entirely into the ground, or a portion of the plate 15 may extend into the ground and a portion remain out of the ground.

The fishing pole 11 is held in position by its own weight, with handle 21 supported upon simple hook 20 as a fulcrum. The weight of the pole 11 above hook 20 causes the pole to tend to rotate about the hook, so that the pole is wedged between the hook and bend 19, and thereby held in place. As shown most clearly in FIGURE 1, the lateral extension 18, the simple hook 20, the upturned pole-gripping portion 22, and the shaft portion 12 form a means for encircling a portion of the pole handle. By using all the dimensions and angles discussed above, the fishing pole will be held in a manner that is most secure and enables excellent rod bending action and easy removability.

The placement of holder 10 in the ground is quite simple, since all that is needed is the application of foot pressure to the top of plate 15 which forces pointed end 14 of shaft 12 into the ground until the lower portion or all of the plate is buried. The pole is then placed in position in hook 20 and bend 19. When a fish pulls on the line, the rod is easily removed from its holder by the fisherman.

Likewise, the holder may be easily connected to the side or end of a rowboat, for example, by tightening bolt 26 until the holder is clamped to the rowboat, and the holder may be raised or lowered by loosening and retightening bolt 25. The pole is placed in position in the holder, and when the fish pulls on the line, the rod can be quickly removed from the holder.

As will be evident from the foregoing, the structure is exceedingly simple, making it easy to manufacture, and the product is easily positioned and used.

The above detailed description of this invention has been given for clarity of understanding only. No unnecessary limitations should be understood therefrom, as modifications will be obvious to those skilled in the art.

The invention is defined in the claims which follow.

I claim:

1. A fishing pole holder formed of a rod that is shaped to comprise a shaft portion, the upper end of the rod extending laterally away from said shaft portion at an angle of between about 100° and about 120° with respect to the longitudinal axis of said shaft portion to form a single bend with said shaft portion, the forward end of said lateral extension being shaped to form a simple curved hook open at the rear facing said bend, the distance between said bend and the farthest point on said hook from said bend being between 3 inches and 4 inches, said simple curved hook lying within a reference plane and following an arc having a slightly larger radius than the radius of the handle of a fishing pole of the type with which the holder is designed to be used, said lateral extension terminating at the outer end of said hook in a short upturned pole-gripping end portion extending away from the outer end portion of said hook at an acute angle with respect to said reference plane, the length of said upturned pole-gripping end portion being no greater than the approximate diameter of the handle of fishing poles of the type with which the holder is designed to be used, said lateral extension forming with said simple curved hook, said upturned pole-gripping end portion and said shaft portion a means for encircling a portion of the fishing pole handle, said hook being laterally displaced with respect to said shaft so that the handle of a fishing pole may be supported upon said hook as a fulcrum, with the upper end of the handle being wedged against said upturned end portion of the lateral extension and the lower end of the handle being wedged, by the weight of the upper end of the fishing pole, against said bend connecting said shaft portion and said lateral extension.

2. A fishing pole holder as described in claim 1, wherein said angle between said lateral extension and said shaft portion is about 110° and the distance between said bend and said farthest point on said hook from said bend is about 3¼ inches.

References Cited

UNITED STATES PATENTS

| | | | |
|---|---|---|---|
| 2,139,826 | 12/1938 | Huntly | 248—44 |
| 2,517,937 | 8/1950 | Stanton | 248—42 |
| 2,593,783 | 4/1952 | Mitchell | 248—38 |
| 2,661,719 | 12/1953 | Scheidt et al. | 248—156 X |
| 2,694,538 | 11/1954 | Consolo et al. | 248—42 |
| 2,701,700 | 2/1955 | Williamson | 248—146 |
| 2,751,174 | 6/1956 | Parker | 248—42 |
| 2,846,896 | 8/1958 | Allen | 248—226 X |
| 2,952,432 | 9/1960 | Valdez | 248—42 |
| 3,006,588 | 10/1961 | Lemi | 248—39 |

ROY D. FRAZIER, *Primary Examiner.*

CLAUDE A. LE ROY, *Examiner.*

F. DOMOTOR, *Assistant Examiner.*